Sept. 25, 1951 A. WOLF 2,568,940
STRAIN MEASUREMENT
Filed Aug. 13, 1946 2 Sheets-Sheet 1

INVENTOR.
ALEXANDER WOLF
BY
Daniel Stryker
ATTORNEY

Sept. 25, 1951 A. WOLF 2,568,940
STRAIN MEASUREMENT
Filed Aug. 13, 1946 2 Sheets-Sheet 2

INVENTOR.
ALEXANDER WOLF
BY Daniel Stryker
ATTORNEY

UNITED STATES PATENT OFFICE 2,568,940

STRAIN MEASUREMENT

Alexander Wolf, Houston, Tex., assignor to The Texas Company, New York, N. Y., a corporation of Delaware Application August 13, 1946, Serial No. 690,164

8 Claims. (Cl. 73—88.5)

This invention relates to strain measurement in which a resistance type strain sensitive gauge is mounted on a member to be tested, and provides improved strain measurement apparatus, particularly an improved mounting for holding the strain sensitive gauge to the member. The invention is particularly applicable to the measurement of strain in sucker rods of oil well pumps and similar reciprocating members. However, it has more general application and is useful for testing other types of installations, especially other oil field equipment, including rod lines, derricks, pumping jacks etcetera.

One way of investigating the performance of pumps located in the bottom of oil wells is to determine the strain on the sucker rods connected thereto and projecting above the collar of the well. The exposed surface of the sucker rod is small and it is continuously reciprocating during operation. It is convenient to measure the strain in such a reciprocating member with a resistance type strain sensitive gauge comprising a conductor, for example a fine wire, which is fastened to the rod or other reciprocating member.

Various types of strain sensitive resistance gauges may be employed, for example that described in U. S. Patent No. 2,292,549. Such a gauge comprises a sinuously wound wire which is placed on a flexible backing, for example a piece of thin paper, and cemented thereto. The backing in turn may be fastened to the reciprocating member by an adhesive or cement. However, such a bonding agent must be permitted to dry or otherwise harden before the results obtained with this type of strain gauge can be relied upon. In oil field work, particularly sucker rod testing, this may require a shut down of several hours while the gauge is properly affixed to the member to be tested. At best, the use of such bonding agent requires two trips to the field, one to affix the strain gauge and a second one in which the test is actually conducted. Moreover, in the severe conditions prevailing in oil field work, a strain gauge held to a member by adhesive may be jarred loose accidentally so that the test is vitiated.

I have overcome the aforementioned difficulty and have discovered that improved results are obtained through fastening a resistance type strain sensitive gauge to a mechanical member undergoing test by means of an overlying resilient pad which presses the strain gauge proper to the member through the action of a clamp. Thus, in apparatus for strain measurement including a resistance type gauge in the form of a flexible conductor adapted to be fastened to a member undergoing strain test, my invention contemplates the combination which comprises a clamp for holding the gauge against the object and a member interposed between clamp and gauge for causing the gauge to be clamped into conformity with the surface of the object. Conveniently, the interposed member acts as a cushion and this cushion should be made of relatively yieldable and preferably resilient material. A rubber pad is excellent for the purpose.

In a strain sensitive resistance type gauge, the resistance of the gauge is a function of strain in the member to which it is securely affixed. I have discovered that the clamping, although it does induce slight additional strain in the gauge, does not affect the accuracy of the result.

By clamping the gauge to the member to be tested, much operating time is saved, prolonged shut downs are avoided and the gauge is more firmly secured to the member and consequently less likely to be jarred loose during tests.

It is desirable to employ an abrasive layer between the strain gauge proper and the member to which it is clamped for test purposes. This aids in anchoring the gauge. Conveniently, the abrasive layer is provided by attaching the strain gauge to the reverse side of a piece of sandpaper, the rough side of the paper being clamped against the member. However, the abrasive may be attached directly to the gauge wire, for example by bonding fine sand thereto with a resin cement.

The strain gauge which is clamped to the member being tested may be connected in one leg of a bridge network which is electrically energized, the strain in the member being measured by determining the bridge unbalance resulting from strain, and other conventional means for measuring resistance change may also be employed.

My invention may be employed conveniently with the bridge arrangement described and claimed in co-pending application Serial No. 690,311, filed August 13, 1946 by Laurence E. Cowles. The invention of Cowles provides means for overcoming the flexure effect of long leads employed to connect the strain gauge into the bridge network. However, the clamp strain gauge of my invention can be employed with other types of bridge networks, and the flexure effect of long leads may be overcome in accordance with my invention by mounting the bridge network on the member being tested, for example by affixing it to the clamp holding the strain gauge.

In one aspect of my invention, the bridge network or at least part of it, in addition to the strain gauge, is fastened to the member undergoing test, thus assuring temperature compensation. Otherwise, the strain gauge per se may be at a different temperature than the rest of the network including the resistances against which it is balanced, thereby introducing an error in measurement.

In a further aspect of my invention, I eliminate the effect of flexure in a reciprocating member being tested by employing a pair of resistance type strain gauges in the form of flexible conductors clamped to opposite sides of the member undergoing test. The two strain gauges are connected together so that flexure effect is eliminated, thus assuring that the gauges will measure only tensile strain in the member, say a sucker rod, being tested.

Details of the invention are set forth hereinafter with reference to the accompanying drawing in which Fig. 1 is a schematic cross sectional view through a reciprocating member having a resistance type strain gauge attached thereto by means of a resilient pad and a clamp;

Figure 1:
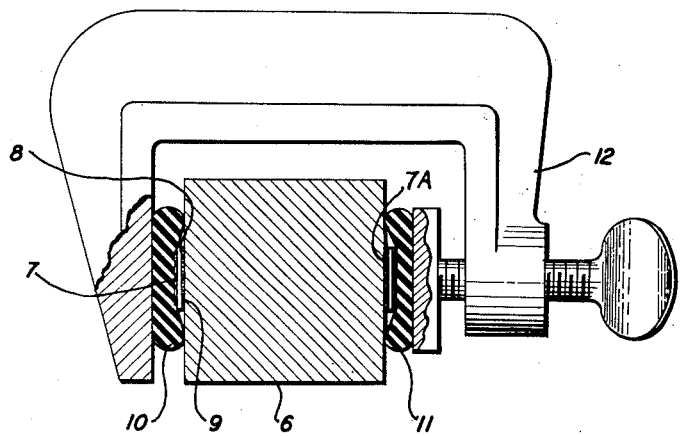

Referring to Fig. 1, a member 6 (say a rod of square section) undergoing test has clamped to it a resistance type strain gauge 7 which is affixed to a thin flexible backing 8, for example a piece of thin paper. The face of the paper toward the member has an abrasive layer 9 which aids in holding the gauge firmly in position. A resilient pad 10, for example a piece of soft rubber, is placed over the gauge. Conveniently a second pad 11 is placed on the opposite side of the member and an ordinary C clamp 12 is employed to squeeze both pads against the member, thus securing the strain gauge in testing position with its length conforming to the surface of the test member.

The second pad 11 is not essential, but it is convenient to use such a pad to avoid marring the member, and it may also be employed when, as described hereinbefore, two resistance type gauges are clamped to opposite sides of the member to compensate for "whip" and determine only tensile strain exerted longitudinally, i. e. transverse to the plane of the section of Fig. 1. A second resistance type strain gauge 7A, identical to the first strain gauge 7, is shown in Fig. 1 held between the member 6 and the second pad 11.

Various types of cushions may be employed, the essential factor being the ability of the cushion to deform sufficiently to assure that the strain gauge conforms to the surface of the member being tested. In Fig. 1, the member being tested is of square cross section, but the invention is equally applicable to sucker rods and the like of other cross section, provided that the pad "gives" sufficiently to assure proper conformance of the gauge to the member.

Figure 2:
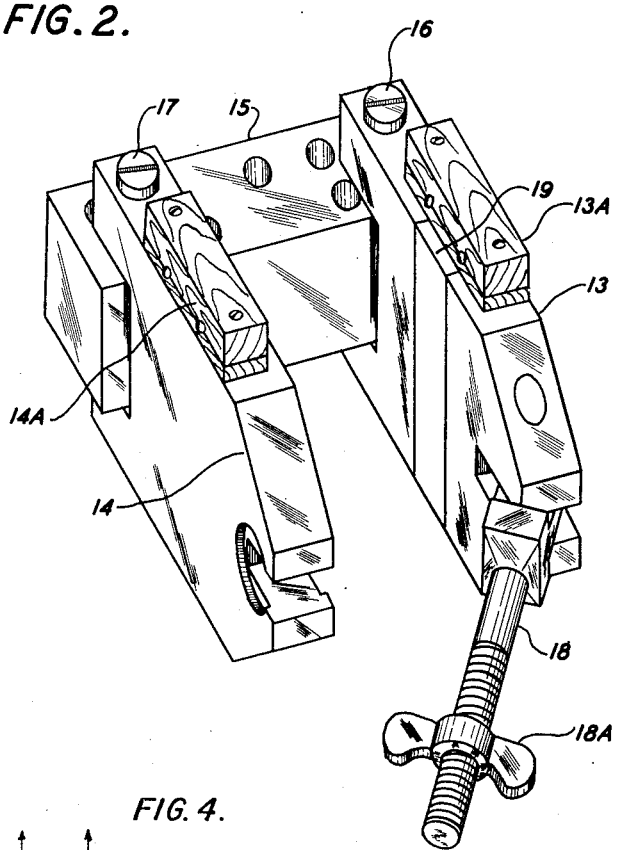
Fig. 2 is a perspective view of an improved form of clamp having resilient pads inserted therein.

A clamp provided with resilient inserts is shown in Fig. 2. It comprises a pair of arms 13, 14 pivotally mounted on the same side of a bar 15. By means of screws 16, 17 (passing through the arms into the bar and acting as pivots) the arms may be adjusted in position along the bar to fit the particular member undergoing test, since the screws may be placed in a number of positions defined by the holes in the bar.

The two arms may be forced toward each other in their front portions by means of a bolt 18 provided with a thumb nut 18A. Resilient pads, of which one 19 is shown, are provided on the inside of each of the arms. Insulator guides 13A, 14A mounted respectively on the tops of the two arms permit leads to be anchored securely and, if desired, also permit other elements (say bridge resistances) to be fastened on the test member.

The use of the clamp of Fig. 2 in strain testing will be readily apparent. It is a U-shaped assembly adapted to be slipped around a sucker rod or the like. By tightening the thumb nut 18A, a strain gauge or the like can be squeezed against the sucker rod and made to conform to its surface by the resilient pads inset in the clamps and overlying the gauge.

As previously indicated, the gauge which is clamped to the sucker rod, may be connected into one leg of a bridge network with flexible leads. In such case, the effect of lead flexure upon the bridge network must be compensated for. One way of accomplishing this result is, as already noted, described and claimed in the aforementioned co-pending application of Laurence G. Cowles and is illustrated in the accompanying Fig. 3.

Figure 3:
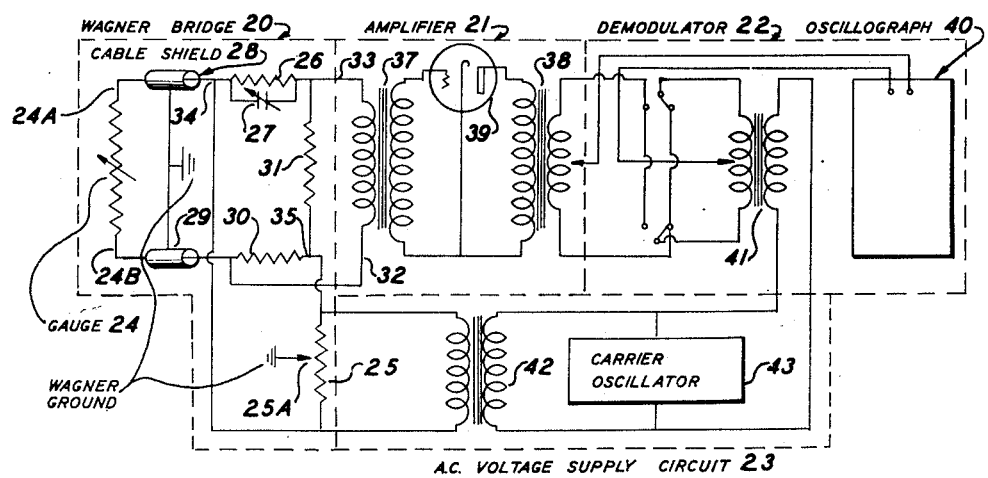
Fig. 3 is a schematic wiring diagram showing the strain gauge of Fig. 1 connected into a suitable measuring and indicating apparatus for strain determination.

The apparatus of Fig. 3 in its entirety comprises a Wagner bridge 20, an amplifier 21, a demodulator 22 and an A. C. voltage supply circuit. A wire resistance type strain gauge 24 clamped to a member to be tested is connected in one leg of the bridge. A potentiometer 25 is connected across the bridge.

In a leg of the bridge adjacent the strain gauge is a fixed resistor 26 which, if desired, may be shunted by a variable capacitance 27, the latter two serving to balance the variable capacitance effect of the gauge proper and also to effect a phase balance of the bridge.

Both sides of the gauge are connected through condensers 28, 29 to ground and to the slider 25A of the central potentiometer which receives its current from the voltage supply circuit 23. The condensers are in reality cable shields disposed respectively around flexible leads 24A, 24B which connects the gauge in the bridge. The two bottom portions of the bridge contain the usual matching resistances 30, 31.

The Wagner bridge just described provides a low potential point to which the cable shields are connected. One of the cable capacitances is, as shown, connected across the voltage source so that it does not affect the bridge balance, while the slider of the potentiometer permits the potential of the low potential point to be adjusted until there is no voltage across the second cable capacitance. With no voltage across this capacitance, the change in the magnitude of the capacitance cannot change the balance of the main bridge circuit. The variable capacitances of the flexible leads and of the strain gauge itself are thus compensated. In this arrangement, therefore, the strain gauge is the only element which has to be mounted on the member being tested for strain, all other members being mountable at a remote point.

The bridge is connected by leads 32, 33 to the amplifier. The other main terminals 34, 35 of the bridge circuit at the ends of the central potentiometer receive an alternating current voltage at say 800 cycles per second from the circuit 23. The frequency of this current should be higher than those of the waves to be recorded.

The amplifier 21 may be an ordinary audio frequency A. C. vacuum tube amplifier equipped with an input transformer 37, one or more amplifying stages (tubes) 39 and an outlet transformer 38. When A. C. voltage is applied to the terminals 34, 35 of the bridge, the strain variation noted by the gauge produces a modulated carrier voltage at the other terminals 32, 33. The output of the bridge across these latter terminals is sent to the amplifier. The output of the amplifier in turn connects through an output transformer 38 to the demodulator 22.

The demodulator operates as a switch and supplies pulses to an oscillograph 40 or other suitable indicator or recorder. One side of the oscillograph is connected to a center tap on the amplifier output transformer 38. The demodulator connects the other side of the oscillograph alternately to opposite sides of the output transformer in synchronism with the carrier frequency as supplied by another transformer 41, thereby rectifying the amplifier's signal.

Current of carrier frequency is supplied to the transformer 41 by a conventional oscillator 43 operating at say 800 cycles as previously described. This oscillator also energizes the bridge through another transformer 42.

The Wagner bridge arrangement of Fig. 3 may be eliminated and a conventional bridge employed with advantage on occasion by mounting the entire bridge (or the resistance of the leg opposite to that in which the gauge is connected) on the clamp or on the member. Thus the entire bridge (or the resistance of the compensating leg) is exposed to the same temperature as is the strain gauge, thereby minimizing the effect of temperature upon the bridge resistances. In mounting the resistance elements of the bridge on the clamp or, if preferred, in clamping them independently to the member undergoing test so that they move with the member to avoid lead flexure, care should be taken that the strain of the member is transmitted only to the gauge. This can be accomplished by mounting the resistances on rigid pieces.

Figure 4:
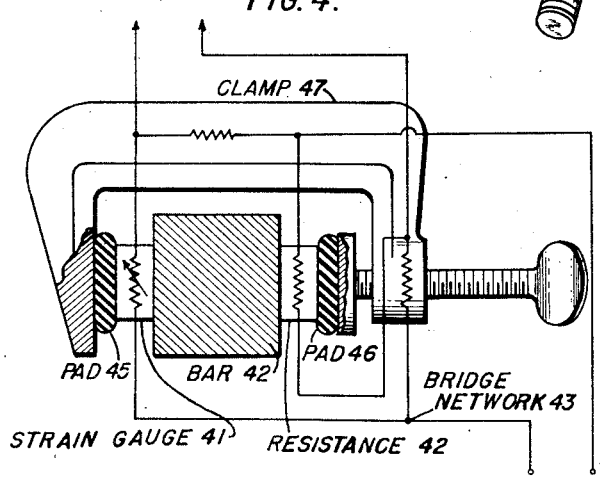
Fig. 4 is a diagram illustrating a further modification of the invention.

Fig. 4 illustrates the mounting of a resistance type strain gauge 41 on a bar 42 undergoing test for strain. The strain gauge is connected in one leg of a bridge network 43 which has a resistance 44 in its opposite leg. Resilient pads 45, 46 hold the gauge and the resistance against the test bar. A clamp 47 presses the pads toward the bar. The remaining legs of the bridge network, as shown, are mounted on the clamp.

I claim:

1. In apparatus for strain measurement, the combination which comprises a resistance type gauge in the form of a flexible conductor adapted to be applied to an object undergoing test for strain, a resilient pad holding the gauge against the object, and a clamp for pressing the pad against the gauge.

2. In apparatus for strain measurement, the combination which comprises a resistance type gauge in the form of a flexible conductor adapted to be applied to an object undergoing test and conforming to the contours of the surface to which it is applied, an abrasive layer interposed between the gauge and the surface, a resilient pad for holding the gauge against the surface and a clamp for pressing the pad against the gauge.

3. In apparatus for strain measurement, the combination which comprises a resistance type gauge in the form of a flexible conductor adapted to be applied to an object undergoing test and conforming to the contours of the surface to which it is applied, a resilient pad for holding the gauge against the surface and a clamp for pressing the pad against the gauge.

4. In apparatus for strain measurement, the combination which comprises a resistance type gauge in the form of a flexible conductor adapted to be applied to an object undergoing test and conforming to the contours of the surface to which it is applied, a flexible sheet upon which the gauge is mounted interposed between the gauge and the surface and having an abrasive layer on the side facing the surface, a resilient pad for holding the gauge against the surface, and a clamp for pressing the pad against the gauge.

5. In apparatus for strain measurement, the combination which comprises a pair of resistance type gauges in the form of flexible conductors adapted to be applied to opposite sides of an object undergoing test for strain, resilient pads holding the respective gauges against the object, and a clamp for pressing the pads against the gauges.

6. In apparatus for strain measurement, the combination which comprises a resistance type gauge in the form of a flexible conductor adapted to be applied to an object undergoing test for strain, a bridge network in one leg of which the gauge is connected and provided with a resistance in the opposite leg, at least one resilient pad holding the gauge and the resistance against the object, and a clamp for pressing the gauge and resistance thus cushioned against the object the remaining legs of the bridge network being mounted on the clamp.

7. In apparatus for strain measurement, including a resistance type gauge in the form of a flexible conductor adapted to be applied to an object undergoing test for strain, the combination which comprises a clamp for holding the gauge against the object, and a cushion interposed between the clamp and the gauge.

8. In apparatus for strain measurement, including a resistance type gauge in the form of a flexible conductor adapted to be applied to an object undergoing test for strain, the combination which comprises a clamp for pressing the gauge against the object, and a member interposed between clamp and gauge for causing the gauge to be clamped into conformity with the surface of the object.

ALEXANDER WOLF.

REFERENCES CITED

The following references are of record in the file of this patent:

UNITED STATES PATENTS

| Number | Name | Date |
|---|---|---|
| 2,381,283 | Hathaway | Aug. 7, 1945 |
| 2,416,664 | Ruge | Feb. 25, 1947 |
| 2,423,842 | McHenry | July 15, 1947 |
| 2,428,012 | Collins | Sept. 30, 1947 |
| 2,472,045 | Gibbons | May 31, 1949 |